Jan. 28, 1947.  C. D. BARNARD ET AL  2,414,790
HOB AND METHOD OF HOBBING
Filed Aug. 2, 1940   2 Sheets-Sheet 1

INVENTOR
Charles D. Barnard
and
Mithander C. Halvorsen
BY Parker, Carlson, Pitner & Hubbard
ATTORNEYS

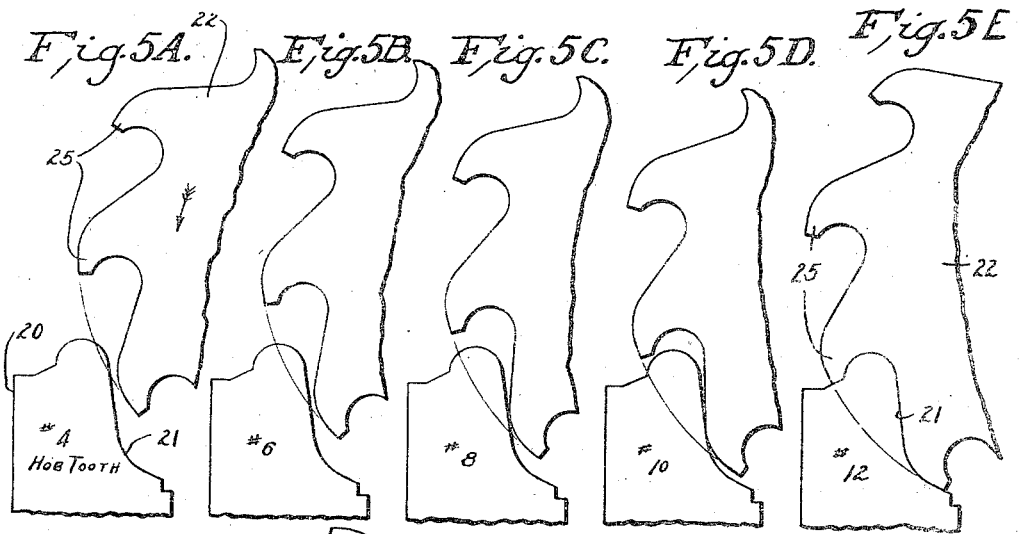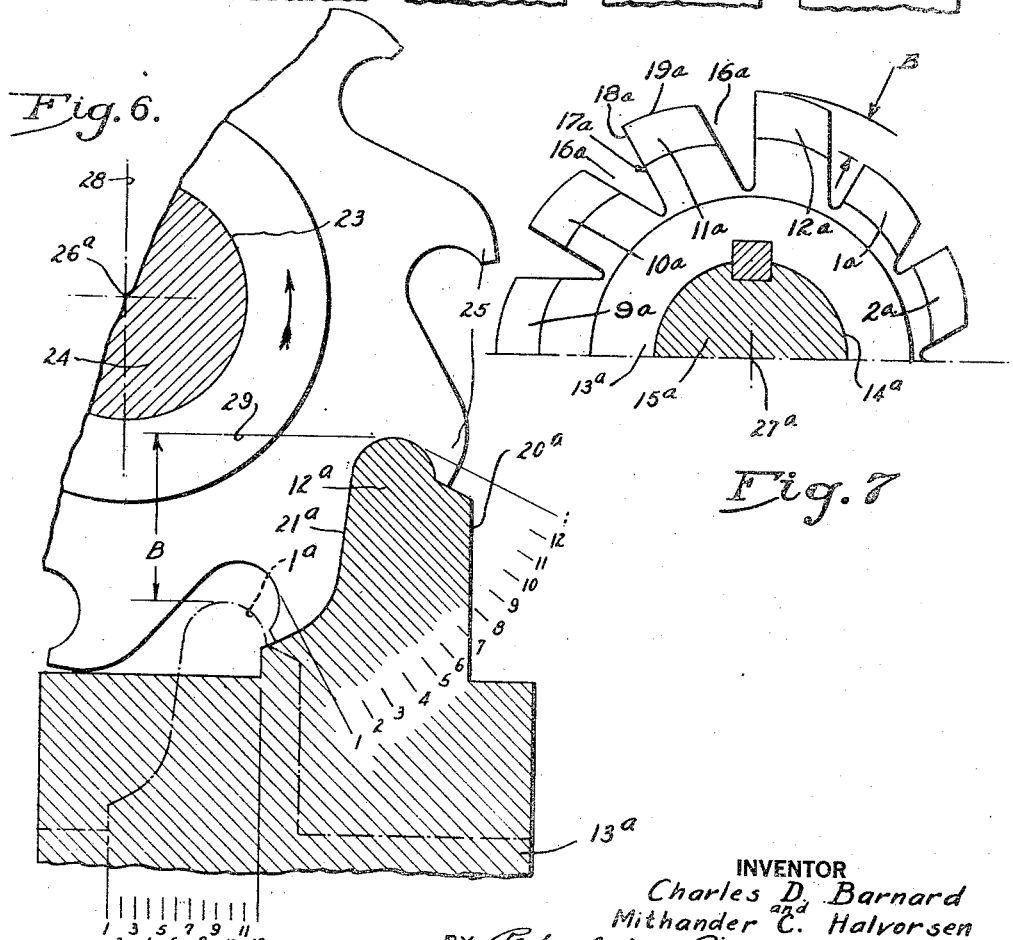

Patented Jan. 28, 1947

2,414,790

UNITED STATES PATENT OFFICE 2,414,790

HOB AND METHOD OF HOBBING

Charles D. Barnard and Mithander C. Halvorsen, Rockford, Ill., assignors to Barber-Colman Company, Rockford, Ill., a corporation of Illinois Application August 2, 1940, Serial No. 349,614

5 Claims. (Cl. 90—4)

The present invention relates to improvements in single position hobs and hobbing methods for cutting toothed elements, such as ratchets, etc.

One of the objects is to provide a novel single position hob having roughing and finishing teeth which are not extensively mutilated to avoid interference, and which are strong and long-lived.

Another object is to provide a new and improved hob of the foregoing character in which the cutting load is substantially uniformly distributed so as to avoid undue load and wear on any one tooth.

A further object is to provide a novel method of hobbing, permitting the use of a single position hob of the foregoing character, and in which more particularly the periphery of the work curves away from the roughing teeth so as to obviate the necessity for extensive, or any, mutilation for the purpose of avoiding tooth interference.

Other objects and advantages will become apparent as the description proceeds.

In the accompanying drawings.

Figs. 5ᵃ to 5ᵉ are a series of fragmentary views illustrating successive teeth of the hob in their full depth cutting relation to one tooth of the work.

Figure 2:
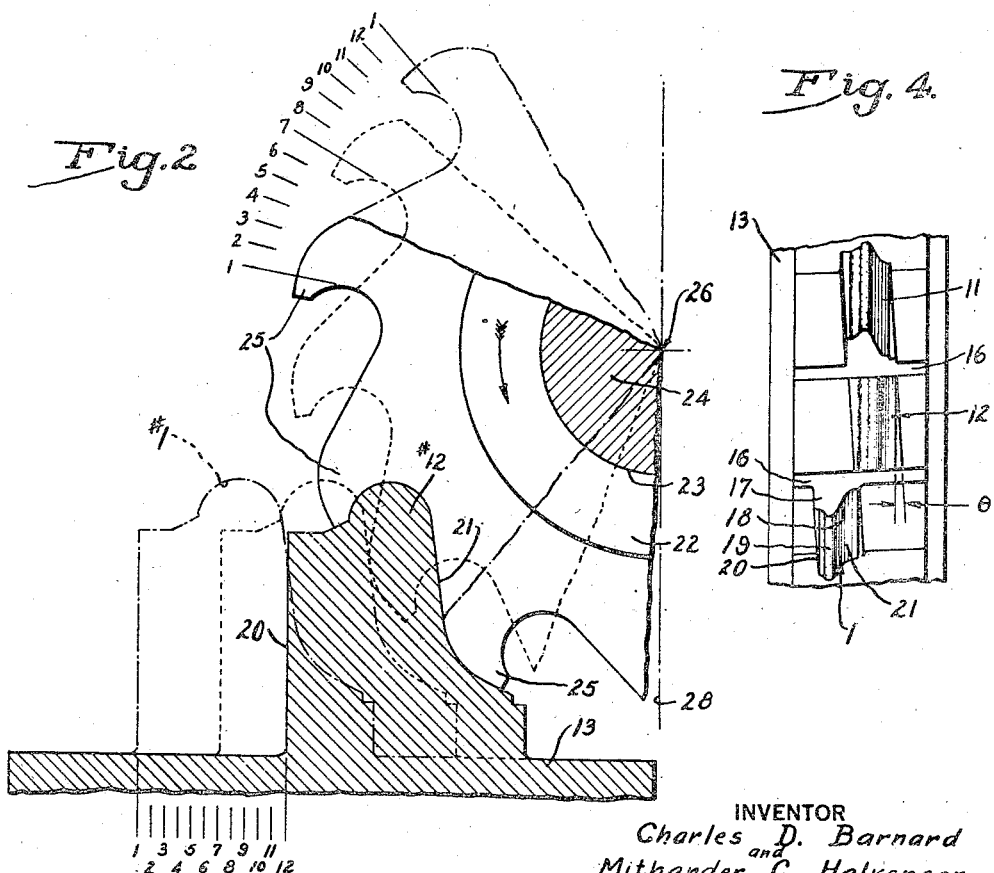
Fig. 2 is an enlarged fragmentary view illustrating the relation of the hob and the work.

Fig. 6 is an enlarged fragmentary view generally similar to Fig. 2, but illustrating the relation of a conventional hob and the work.

Fig. 7 is an end view of the conventional hob.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more particularly to the drawings, the hob constituting the exemplary embodiment of our invention comprises a body 13 having a central bore 14 adapted to receive a suitable arbor 15. Formed on the periphery of the body 13 is a helical series of radially relieved hob teeth separated by gashes 16. These gashes may be either slightly inclined or straight relative to the hob axis. At least one convolution of hob teeth is provided, one convolution, comprising twelve successive teeth 1 to 12, being specifically shown.

Figure 4:
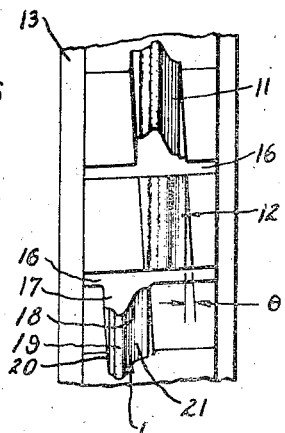
Fig. 4 is a fragmentary plan view of the hob.

Each hob tooth has a front face 17 defining a cutting edge 18, a top surface 19 and side surfaces 20 and 21, the top and side surfaces having a radial relief. Additional side clearance may be obtained when desired by inclining the teeth laterally to the hob helix, as indicated by the angle $\theta$ (Fig. 4). The teeth 1 to 12 may be provided with any desired cutting contour depending upon the work to be hobbed. In the present instance, the hob is of the single position type adapted to hob ratchets, and similar toothed elements, having raked or undercut teeth. One form of ratchet is partially illustrated in Fig. 2, and comprises a body 22 which has an axial bore 23 adapted to receive a supporting arbor or shaft 24, and which is to be formed with undercut peripheral teeth 25.

The leading hob teeth, for example, the teeth 1 to 11, are roughing teeth adapted in their successive actions to take preliminary cuts progressively along the form of each tooth 25 of the work blank, and at least the last tooth 12 is a finishing tooth. All of the teeth 1 to 12 preferably have the same form or cutting contour.

Use of the hob entails a novel method of hobbing. In this method, the hob is positioned substantially transversely of the work axis, and is inclined slightly to a perpendicular to the axis to compensate for the hob helix angle. Also, the hob is located at one side of the center line of the work in such relation that the periphery of the work while passing through cutting engagement travels toward, instead of from, the hob axis. In the specific arrangement of Fig. 2, the ratchet 22 is rotatable counterclockwise about its axis 26, and the hob is rotatable clockwise as viewed from the right end about its axis 27. Consequently, the hob is located to the left of the center line 28 of the ratchet. If the work were rotatable in a clockwise direction, the hob would be reversed in form, and would be located to the right of the center line 28. With the hob and the work relatively located as shown in Fig. 2, both are rotated in such timed relation that the hob will complete one revolution during rotation of the work through the distance of each tooth 25, i. e., through 36° where the ratchet has ten teeth. In this rotation, the hob teeth, from 1 to 12, move successively through cutting engagement with each ratchet tooth 25, and remove their proportionate share of metal progressively along the form of the work. The roughing teeth 1 to 11 take preliminary cuts, and the last or finishing tooth 12 takes a final cut as clearly illustrated in Figs. 5a to 5e, inclusive. It is to be understood that in the continued revolutions of the work blank, the hob is slowly fed relatively along the work axis 26.

Figure 1:
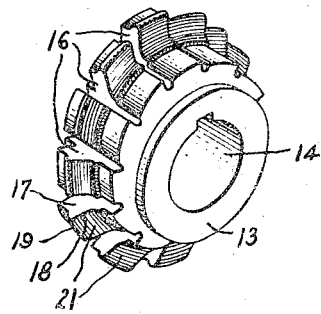
Figure 1 is a perspective view of a hob embodying the features of our invention.
Figure 3:
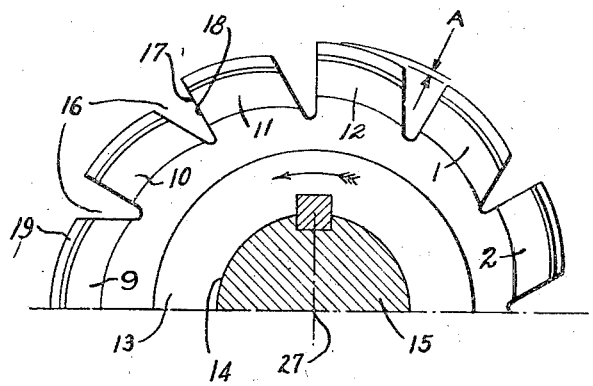
Fig. 3 is a fragmentary end view of the hob.

It will be noted that the portion of the periphery of the work blank 22 advancing toward the position of final engagement by the hob tooth 12 curves or drops away from the roughing teeth 1 to 11. As a result, little or no interference is encountered so that the hob may be cylindrical in most instances, and, in special cases where mutilation may be desirable, the successive roughing teeth from 11 to 1 are stepped down or reduced in height only slightly, as indicated at A for the tooth 1 in Fig. 3.

By reason of the foregoing, the gashes 16 are comparatively shallow and narrow, and the teeth 1 to 12 are correspondingly long in a peripheral direction and strong so that they may be frequently resharpened. Each tooth performs substantially its full share of the work, thereby preventing any one tooth, such, for example, as the finishing tooth 12, from being subjected to an unduly heavy load and attendant rapid dulling thereof. Consequently, a long life is obtained, and a rapid cutting feed is permitted.

The elimination or minimization of tooth interference permits of a material decrease in circular pitch of the hob so that many more teeth are brought into contact with the work, and the amount of stock removed by the teeth is substantially equalized. Heretofore, the circular pitch of single position hobs has been approximately equal to that of the work. In the present instance, the circular pitch of the hob is considerably less than that of the work. Hence, the present hob and method result in a smooth cutting action.

The location of the hob is at the side of the center line of the work opposite to that occupied in conventional methods. Comparison is facilitated by reference to Figs. 6 and 7 which illustrate a conventional single position hob adapted to cut the same ratchet illustrated in Fig. 2. Like parts of the ratchet in Fig. 6 are therefore identified by the same reference numerals as in Fig. 2.

The conventional hob illustrated in Figs. 6 and 7 comprises a body 13a formed with an axial bore 14a, and with one convolution of twelve teeth 1a to 12a separated by flutes 16a. Each of the teeth is spirally relieved, and has a cutting face 17a defining a contoured cutting edge 18a, a top surface 19a, and opposite side surfaces 20a and 21a.

In the conventional use of the hob of Fig. 7, it is located to the right of the work center line 28 (Fig. 6) so that the periphery of the work in passing through the cutting zone curves or travels from the axis of the hob. As a result, extensive mutilation of the teeth 1a to 11a is required to avoid interference with the work. This will be evident upon noting that the hob, if substantially cylindrical in form, would project substantially to the secant line 29 (Fig. 6) extending across the work blank inwardly of the teeth 25. The extensive mutilation or step-down of the roughing teeth 1a to 11a, as indicated at B for the tooth 1a (Fig. 7), necessitates deep gashes 16a, and a corresponding reduction in the peripheral length, strength and life of the teeth. Also, the cutting load is unevenly distributed, the last or finishing tooth 12a being required to perform most of the work so that it dulls quickly, and limits the rate of feed.

We claim as our invention:

1. The method of hobbing a rotary toothed element having undercut peripheral teeth comprising mounting a single position hob having a spiral convolution of leading roughing teeth and a trailing finishing tooth in cutting relation with said element wholly at one side of the center line of said element, rotating said element in a direction to advance that portion of the periphery of said element which is in engagement with said hob toward the axis of said hob, and rotating said hob in timed relation to said element through one revolution for each rotation of said element through the distance of one element tooth.

2. The method of hobbing a rotary toothed element having peripheral teeth by a single position hob having a helical convolution of relieved leading roughing teeth and a trailing finishing tooth of a smaller circular pitch than said element, said method comprising locating said hob in cutting relation to said element with said finishing tooth disposed between said roughing teeth and the center line of said element, and rotating said element and said hob in timed relation, with the periphery of said element at the point of cutting engagement moving toward the hob axis.

3. A method of hobbing a rotary toothed element having peripheral teeth comprising mounting a single position hob having a spiral convolution of teeth in cutting relation with said element wholly at one side of the centerline of said element, rotating said element and said hob in timed relation, taking a roughing cut into the element by the leading teeth of the hob, and taking a finish cut along the entire contour cut in the element with a trailing tooth.

4. A single position cylindrical hob for form-hobbing a rotary ratchet having undercut peripheral teeth, said hob comprising a rotary body having only one helical convolution of relieved effective hob teeth of the same and uniform lead on opposite sides, said teeth having cutting contours all substantially the same and being of substantially equal height relative to the hob axis, the leading teeth being roughing teeth and the last trailing tooth being a finishing tooth.

5. A single position cylindrical hob for form-hobbing a rotary ratchet having undercut peripheral teeth, said hob comprising a rotary body having only one helical convolution of relieved effective hob teeth and adapted to be positioned entirely at one side of the center line of the ratchet perpendicular to the hob axis in the path of the approaching ratchet teeth, the leading hob teeth being roughing teeth and the last trailing hob tooth being a finishing tooth having a cutting contour the same as the final complete contour of the ratchet teeth, the circular pitch of the hob being less than that of the ratchet.

CHARLES D. BARNARD.
MITHANDER C. HALVORSEN.